United States Patent
Driscoll

(10) Patent No.: US 6,763,363 B1
(45) Date of Patent: Jul. 13, 2004

(54) COMPUTER EFFICIENT LINEAR FEEDBACK SHIFT REGISTER

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/453,008

(22) Filed: Dec. 2, 1999

(51) Int. Cl.⁷ .................................................. G06F 1/02
(52) U.S. Cl. ..................................... 708/252; 708/253
(58) Field of Search ................................. 708/160, 250, 708/270, 255, 252–254; 380/46, 1; 375/130; 331/78

(56) References Cited

U.S. PATENT DOCUMENTS

| | | | |
|---|---|---|---|
| 4,543,559 A | | 9/1985 | Guillou et al. |
| 5,257,282 A | * | 10/1993 | Adkisson et al. ............. 380/46 |
| 5,307,409 A | | 4/1994 | Driscoll |
| 5,365,585 A | * | 11/1994 | Puhl et al. .................... 331/78 |
| 5,600,720 A | * | 2/1997 | Iwamura et al. ............... 380/1 |
| 6,181,729 B1 | * | 1/2001 | O'Farrell .................... 375/130 |
| 6,188,714 B1 | * | 2/2001 | Yamaguchi ................. 375/130 |

FOREIGN PATENT DOCUMENTS

| | | |
|---|---|---|
| EP | 0495706 A | 7/1992 |
| EP | 0495706 | 7/1992 |
| EP | 1052569 | 11/2000 |
| EP | 1052569 A | 11/2000 |

OTHER PUBLICATIONS

Anna Yu, RSFQ Pseudo Random Generator and Its Possible Applications, Jun. 1995, IEEE Transactions on Applied Superconductivity, vol. 5 No. 2, p. 2820–2822.*

Zeng, Kencheng et al., "Pseudorandom Bit Generators in Stream–Cipher Cryptography," IEEE Computer, pp. 8–17, (Feb. 1991).

Saarinen et al.: "VLSI implementation of Tausworthe random number generator for parallel processing environment" IEEE Proceedings E. Computers & Digital Techniques., vol. 138, No. 3, 1991, pp. 138–146, XP000230809, Institution of Electrical Engineers Sevenage., GB ISSN: 1350–2387, p. 142, Column 1, Line 9–Line 30, Figure 5.

Saarinen, et al., "VLSI implementation of Tausworthe random number generator for parallel processing environment", *IEEE Proceedings E. Computers and Digital Techniques, 138 (3)*, XP000230809, Institution of Electrical Engineers Sevenage., GB ISSN: 1350–2387, p. 142, Column 1, Line9–Line 30, Figure 5,(1991), 138–146.

* cited by examiner

*Primary Examiner*—Kakali Chaki
*Assistant Examiner*—Chat Do
(74) *Attorney, Agent, or Firm*—Kris T. Fredrick

(57) ABSTRACT

A fast pseudo-random number generator, which can be employed in a variety of systems such as a stream cipher cryptosystem or a Monte Carlo simulation system, includes a linear feedback shift register (LFSR) having a state contained in N storage elements storing N bits of binary data which are separated into w words having word length M. At least two tap sources provide binary data, each tap source has a number of bits which is a multiple of M. The LFSR also includes a linear feedback function coupled to tap sources and providing a temporary value which is a linear function, such as bit-wise exclusive-or, of the binary data provided from the tap sources. The LFSR state is advanced by shifting the binary data in the storage elements by a multiple of M bits and provide the temporary value to fill in storage elements that would otherwise be empty from the shifting.

31 Claims, 3 Drawing Sheets

COMPUTER EFFICIENT LINEAR FEEDBACK SHIFT REGISTER

THE FIELD OF THE INVENTION

The present invention generally relates to psuedo-random number generators (PRNGs), and more particularly relates to systems, such as private-key stream cipher cryptosystems, which employ linear feedback shift registers to produce pseudo-random bit keystreams, such as keystreams for combining with plaintext to encrypt the plaintext into ciphertext and keystreams for combining with the ciphertext to decipher the ciphertext into plaintext.

BACKGROUND OF THE INVENTION

Pseudo-random number generators (PRNGs) are used in a variety of systems such as cryptosystems, Monte Carlo simulation systems, games, and heuristic design systems (e.g., gate array placement and routing systems). In particular, cryptosystems perform cryptography to transform plaintext into ciphertext so that only an authorized receiver can transform the ciphertext back into the original plaintext. Encryption or enciphering is the process that transforms plaintext into ciphertext. Decryption or deciphering is the process that transforms ciphertext into plaintext.

A parameter called an encryption key is employed by a cryptosystem to prevent the plaintext from being easily revealed by an unauthorized person. A sender transforms a given plaintext into a large variety of possible ciphertexts selected by the specific encryption key. A receiver of the ciphertext deciphers the ciphertext by employing a parameter referred to as a decryption key. In a public-key cryptosystem, the encryption key is made public while the decryption key is kept secret. Therefore, in public key cryptosystems, the decryption key must be computationally infeasible to deduce from the encryption key. In a private-key cryptosystem, the sender and the receiver typically share a common key that is used for both enciphering and deciphering. In such a private-key cryptosystem, the common key is alterable and must be kept secret.

Private-key cryptosystems are typically implemented as block cipher cryptosystems or stream cipher cryptosystems. Block cipher cryptosystems divide the plaintext into blocks and encipher each block independently using a stateless transform. In block cipher cryptosystems if one fixed common private-key is employed to encipher different occurrences of a particular plaintext block, all of these occurrences are encrypted into identical corresponding ciphertext blocks. Therefore, the block size is preferably selected to be large enough to frustrate attacks from a cryptanalyst, which analyzes the occurrence frequencies of various patterns among the ciphertext blocks. Example block sizes are 64 bits and 128 bits.

In stream cipher cryptosystems, the plaintext is typically encrypted on a word-by-word basis using a stateful transform that evolves as the encryption progresses. In encrypting the plaintext binary data sequence for transmission as a ciphertext binary data sequence, the common private-key is a parameter that controls a pseudo-random bit generator to create a long sequence of binary data referred to as a keystream. The stream cipher cryptosystem includes a cryptographic combiner, which combines the keystream with the plaintext sequence. The cryptographic combiner is typically implemented with exclusive-or (XOR) bit-wise logic functions, which perform bit-wise modulo-2 addition. The cryptographic combiner produces the ciphertext. At the receiver, the common private-key controls a receiver pseudo-random bit generator to produce a decryption keystream. The decryption keystream is combined with a decryption combiner to decrypt the ciphertext to provide the plaintext to the receiver. The receiver decryption combiner operation must be the inverse of the sender encryption combiner operation. For this reason, the most common combiner operation is bit-wise XOR, which is its own inverse.

One problem with stream cipher cryptosystems is the difficulty of generating a long, statistically uniform, and unpredictable sequence of binary data in the keystream from a short and random key. Such sequences are desirable in the keystream in cryptography to make it impossible, given a reasonable segment of its data and sufficient computer resources, to find out more about the sequences.

There are four general requirements for cryptographically secure keystream PRNGs. First, the period of a keystream must be large enough to accommodate the length of the transmitted message. Second, the keystream output bits must have good statistical properties (e.g. values are uniformly distributed). Third, the keystream output bits must be easy to generate. Fourth, the keystream output bits must be hard to predict. For example, given the PRNG and the first N output bits, $a(0), a(1), \ldots, a(N-1)$, it should be computationally infeasible to predict the $(N+1)^{th}$ bit $a(N)$ in a sequence with better than a 50—50 chance. In otherwords, a cryptanalyst should not be able to generate other forward bits or backward bits if presented with a given portion of the keystream output sequence.

The PRNG employed in stream cipher cryptosystems, often employs a feedback shift register (FSR) which includes N storage elements and a feedback function that expresses each new element $a(t)$ of the sequence in terms of the previous generated elements $a(t-N), a(t-N+1), \ldots, a(t-1)$. Each individual storage element of the FSR is called a stage, and the binary signals $a(0), a(1), a(2), \ldots, a(N-1)$ are loaded into the stages as initial data to generate the keystream sequence. The period of the keystream sequence produced by the FSR depends both on the number of stages and on the details of the feedback function. The maximal period of a keystream sequence generated by an N-stage FSR with a non-singular feedback function is $2^N$, which represents the number of possible states of the N-stage FSR.

Depending on whether the feedback function is linear or is non-linear, the FSR is referred to respectively as a linear feedback shift register (LFSR) or a non-linear feedback shift register (NLFSR).

In particular, the LFSR is employed in many pseudo-random bit generators for stream cipher cryptosystems. LFSRs are preferred over most other PRNGs because mathematics are available to design LFSRs with guaranteed long sequence length and good statistics. The LFSR feedback function is of the form $a(t)=c_1 a(t-1)$ XOR $c_2 a(t-2)$ XOR ... XOR $c_{N-1} a(t-N+1)$ XOR $n_N a(t-N)$, where $c_i$ is an element of the set $\{0,1\}$. Each stage that is associated with a non-zero $c_i$ is referred to as a tap. The feedback function of an LFSR can be represented formally by what is referred to as a feedback polynomial:

$$f(x)=1+c_1 x+c_2 x^{N-2}+\ldots+c_{N-1}x^{N-1}+c_N x^N$$

where the intermediate x has no other meaning than as a mathematical symbol. This feedback polynomial decides the period and the statistical behavior of the keystream output sequence. To avoid trivial output, the zero-state should be excluded from the initial setting. This limits the largest possible period of an LFSR to $2^N-1$ In general, to generate the largest possible period $2^N-1$ for the output sequence, the feedback polynomial f(x) of the LFSR should be primitive. A sequence generated by an LFSR with a primitive feedback polynomial is referred to as a maximal-length LFSR sequence or simply an m-sequence. However, m-sequences cannot be used as keystreams without undergoing further cryptographic transformation. Without this further cryptographic transformation, the key of secrecy (i.e, the initial state of the LFSR and the feedback function of the LFSR) of an N-stage LFSR can be determined from just 2N successive bits of the output sequence.

Efficient synthesis procedures exist for finding feedback polynomials of the shortest LFSR that would generate a given output sequence. The length of such an LFSR is referred to as the linear complexity of the sequence. As a result, an LFSR suitable for employment in a cryptosystem, must guarantee a large enough key-independent lower bound to the linear complexity of the sequences the LFSR generates.

Conventional LFSRs implemented in software are particularly slow, because a relatively large number of instructions need to be executed to obtain each new one bit element a(t) and to shift the new element a(t) into the LFSR by shifting each bit of the LFSR to the left or right depending on the implementation of the LFSR. A detailed example of this problem with conventional LFSRs is provided in the Description of the Preferred Embodiment section of the present specification.

Because LFSRs implemented in software are very slow, various techniques have been attempted to speed-up the software implemented LFSR. For example, a matrix multiply has been used to advance an LFSR by multiple bits. Another speed-up technique is to run parallel LFSRs. However, parallel LFSRs are slow to initialize and occupy many times more memory than the equivalent serial implementation. None of the conventional speed-up techniques provide a significant time reduction in implementing an LFSR in software.

For reasons stated above and for other reasons presented in greater detail in the Description of the Preferred Embodiments section of the present specification, a PRNG is desired which uses an LFSR implemented in software and which is significantly faster than the conventional speed-up techniques used for LFSRs which generate pseudo-random numbers.

SUMMARY OF THE INVENTION

The present invention provides a pseudo-random number generator (PRNG) that includes a linear feedback shift register (LFSR) having a state. The LFSR includes N storage elements (stages) storing N bits of binary data, which are separated into w words having word length M. T tap sources provide binary data from the stages. Each tap source has a number of bits, which is a multiple of M, taken from contiguous LFSR stages beginning or ending on a stage that is a multiple of M. The LFSR also includes a linear feedback function coupled to the T tap sources and providing a temporary value, having a number of bits which is a multiple of M, which is a linear function of the binary data provided from the T tap sources. The LFSR state is advanced by shifting the binary data in the storage elements by a multiple of M bits and providing the temporary value to fill in storage elements that would otherwise be empty from the shifting. Thus, each advance of the LFSR produces a multiple of M new bits in the PRNG sequence.

One bit of each tap source is a tap bit. This tap bit is the most significant bit if the LFSR is left shifted or the least significant bit if the LFSR is right shifted.

In one embodiment of the PRNG, the LFSR is implemented in software. In another embodiment, the LFSR is implemented in hardware. In one embodiment of the software implementation of the LFSR, the LFSR is implemented in a computer system which accesses more than one computer word size, where each computer word size includes M bits. In one embodiment of the software implementation of the LFSR, register or location renaming is used instead of movement of words for the shift the binary data in the storage elements by a multiple of M bits.

In one embodiment, N is one less than a multiple of the M (e.g., N=127 or N=159 where M=32 bits). For this reason, in an embodiment where the LFSR is left shifted in response to each clock pulse, the least significant bit of the least significant LFSR word is a zero. The LFSR can also be embodied in a right shifting LFSR.

In one embodiment, for each LFSR state advancement, the temporary value is left shifted by one bit with a zero shifted into the least significant bit and then stored in the least significant LFSR word. The lost bit resulting from the temporary value being left shifted by one bit is stored in a carry-flag. Subsequently, the carry-flag is stored in the least significant bit of the second least significant LFSR word, to replace the least significant bit that had been zeroed by the left shift of the temporary value in the previous iteration. In one form of this embodiment, the storage of the carry-flag in the least significant bit of the second least significant LFSR word is accomplished by adding the carry-flag to the word with an ADD WITH CARRY instruction.

One form of a stream cipher cryptosystem according to the present invention includes a PRNG receiving a key and providing a keystream. The PRNG includes a word-by-word shifting LFSR according to the present invention for providing a LFSR output word of word length M. The stream cipher cryptosystem also includes a cryptographic combiner for combining a first binary data sequence and the keystream to provide a second binary data sequence. In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

The PRNG according to the present invention includes a word-by-word shifting LFSR, which can be implemented in software significantly faster than the conventional speed-up techniques used for LFSRs which generate pseudo-random numbers.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
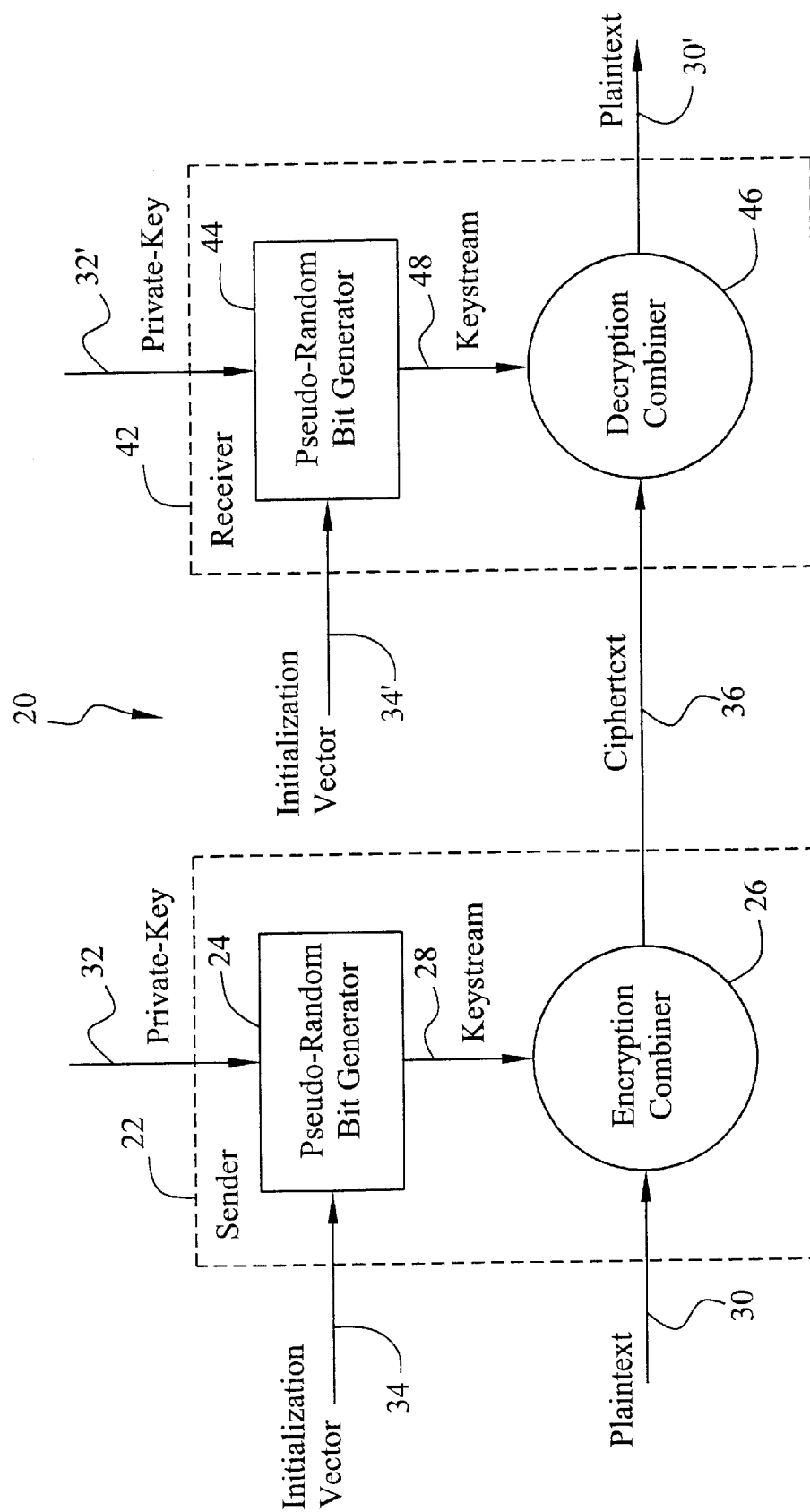
FIG. 1 is a block diagram of a private-key stream cipher cryptosystem according to the present invention.

A private-key stream cipher cryptosystem according to the present invention is illustrated generally at 20 in FIG. 1 in block diagram form. Stream cipher cryptosystem 20 includes a sender 22, such as a computer system, and a receiver 42, such as a computer system.

Sender 22 includes a pseudo-random number generator (PRNG) 24 and an encryption combiner 26. PRNG 24 receives a private-key 32 which controls PRNG 24 to produce an encryption keystream 28 to be provided to encryption combiner 26. In the embodiment illustrated in FIG. 1, an initialization vector 34 is also provided to PRNG 24 to ensure that encryption keystream 28 is not the same even if the same private-key 32 is used to control PRNG 24 for multiple messages. Initialization vector 34 can be embodied as a true random number to ensure that every message which is encrypted is slightly different.

Plaintext 30 is also provided to encryption combiner 26. Plaintext 30 is a binary data sequence. Encryption combiner 26 combines plaintext 30 and encryption keystream 28 to form ciphertext 36, which is also a binary data sequence. In one embodiment, encryption combiner 26 is implemented with exclusive-or (XOR) bit-wise logic functions which perform bit-wise module-2 addition.

Receiver 42 includes PRNG 44 and decryption combiner 46. PRNG 44 receives private-key 32', which is the same private-key as the private-key 32. PRNG 44 is controlled by private-key 32' to produce keystream 48, which is provided to decryption combiner 46. In the embodiment illustrated in FIG. 1, an initialization vector 34' which is the same initialization vector as initialization vector 34 is provided to PRNG 44 to ensure that decryption keystream 48 is identical to encryption keystream 28 for a given private key 32/32' and initialization vector 34/34'.

Decryption combiner 46 receives ciphertext 36 and combines ciphertext 36 with decryption keystream 48 to produce plaintext 30', which is a binary data sequence which substantially matches plaintext 30. Decryption combiner 46 must have a combiner operation which is the inverse of the combiner operation of encryption combiner 26 so that encryption keystream 28 can be used to encrypt plaintext 30 to form ciphertext 36 and decryption keystream 48, which is identical to encryption keystream 28, can be used to decrypt ciphertext 36 to form plaintext 30'. For this reason, the most common cryptorgraphic combiner operation is bit-wise XOR, which can be used for both the encryption and decryption combiner operations.

As mentioned in the Background of the Invention section of the present specification, PRNG 24 and 44 should have the following general characteristics to produce cryptographically secure keystreams 28 and 48. First, the period of a keystream must be large enough to accommodate the length of the transmitted message. Second, the keystream output bits must be easy to generate. Third, the keystream output bits must be hard to predict.

Figure 2:
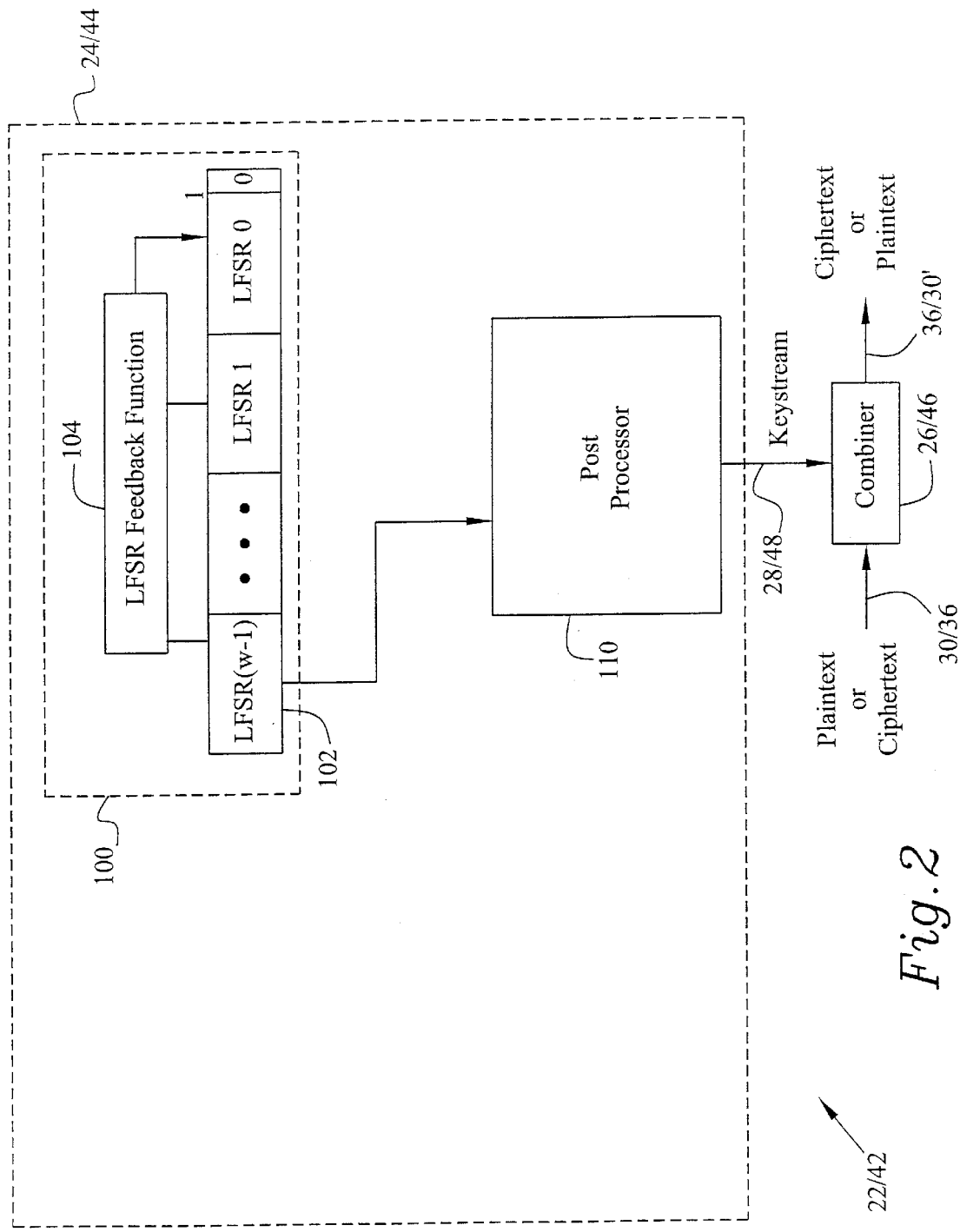
FIG. 2 is a block diagram of a sender or receiver of the cryptosystem of FIG. 1 wherein a pseudo-random number generator is illustrated in greater detail.

The sender 22 or receiver 42 of cryptosystem 20 of FIG. 1 is illustrated generally in block diagram form in FIG. 2 wherein the PRNG 24/44 is illustrated in greater detail. The present invention is described herein relative to a cryptosystem which employs a PRNG according to the present invention, but the PRNG according to the present invention can be used in a variety of systems, such as cryptosystems, Monte Carlo simulation systems, games, and heuristic design systems (e.g., gate array placement and routing systems). PRNG 24/44 includes a linear feedback shift register (LFSR) 100. LFSR 100 includes N storage elements 102 and a linear feedback function 104 that expresses each new element a(t) of the sequence in terms of the previous generated elements a(t−N), a(t−N+1), ..., a(t−1). LFSR storage elements 102 are referred to as stages and binary signals a(0), a(1), a(2), ..., a(N−1) are loaded into the stages as initial data to generate a keystream sequence.

LFSR storage elements 102 are divided into w LFSR words of word length M represented as LFSR 0, LFSR 1, ..., LFSR (w−1). LFSR 0 includes a 0 bit in its least significant bit (LSB), because LFSR 100 must have a feedback polynomial f(x) represented by linear feedback function 104 which is primitive, to provide a maximal length sequence with good statistics. To be primitive, the number of storage elements N must not be a multiple of 8, according to the known mathematics. Suitable example sizes for N and w, where each word length M is 32 bits, are: N=127 and w=4; and N=159, w=5.

Most crypto-systems using LFSRs incorporate means to non-linearize the LFSR output to prevent certain plaintext attacks. Plaintext attacks by cryptanalysts are performed by knowing certain plaintext and observing the ciphertext to yield information about the keystream and then working backwards to determine the key of secrecy of the LFSR (i.e., the initial state of the LFSR and the feedback function of the LFSR). Since the LFSR is linear, it is possible to ascertain the initial state and the linear feedback function if sufficient plaintext is known by the cryptanalyst. The non-linearization techniques include "clock control" (the LFSRs are advanced pseudo-randomly), non-linear transforms of the LFSR output, and non-linear combination of multiple LFSR. Any or all of these means can be used with the present invention. In FIG. 2, optional post processor 110 can be employed to perform post processing, such as non-linear filtering, of the LFSR 100 output to non-linearize the LFSR output to prevent certain plaintext attacks. In the embodiment illustrated in FIG. 2, the output from LFSR 100 is provided from the most significant word LFSR (w−1). In other embodiments, the LFSR 100 output is obtained from a selected one of the other LFSR words (i.e., LFSR 0, LFSR 1, ..., LFSR (w−2) depending on the characteristics of the particular LFSR 100.

Figure 3:
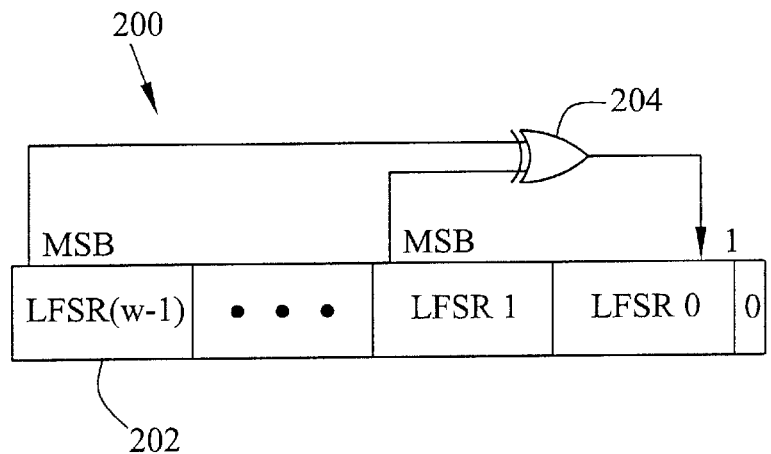
FIG. 3 is a block diagram of a prior art linear feedback shift register.

A conventional bit-by-bit LFSR is illustrated generally at 200 in FIG. 3. Conventional LFSR 200 includes N storage elements 202 which are divided into w words of word length M represented as LFSR 0, LFSR 1, ..., LFSR (w−1). In the embodiment of LFSR 200 illustrated in FIG. 3, a linear feedback function is performed by a XOR logic function 204, which performs a XOR logical operation on the most significant bit (MSB) of the most significant word LFSR (w−1) and one or more other bits of one or more other words such that the bits used represent a primitive polynomial. The LFSR is shifted to the left and the output from XOR logic function 204 is fed back into the second most LSB of LFSR 0. Again, LFSR 0 includes a zero bit in its LSB location because the feedback polynomial f(x) of LFSR 200 must be primitive to provide maximal length and good statistics. Accordingly, the N number of storage elements 202 must not be a multiple of 8.

The following pseudo-C code I implements a 127-bit two-tap conventional bit-by-bit left shifting LFSR 200 on a 32-bit word computer system.

Pseudo-C code I

```
for(i=0, i<32, i++){
    temp=(LFSR[3]>>31)^
        (LFSR[1]>>31);
    LFSR[3]=(LFSR[3]<<1)|
        (LFSR[2]>>31];
    LFSR[2]=(LFSR[2]<<1)|
        (LFSR[1]>>31];
    LFSR[1]=(LFSR[1]<<1)|
        (LFSR[0]>>31];
    LFSR[0]=(LFSR[0]<<1)| temp;
{
```

As can be seen by the above pseudo-C code I, implementation of a 127-bit two-tap conventional bit-by-bit LFSR 200 on a 32-bit word computer system, there are approximately 17 instructions required to obtain each new one-bit element a(t) and to left shift the new element a(t) into the 127-bit conventional bit-by-bit LFSR 200. Moreover, 17 instructions per bit times 32 bits per word or 544 instructions (plus loop overhead) are required to obtain a whole new 32-bit word left shifted into the conventional bit-by-bit LFSR 200. Therefore, software implementations of conventional bit-by-bit LFSR 200, such as represented by the above pseudo-C code, are extremely slow.

Figure 4:
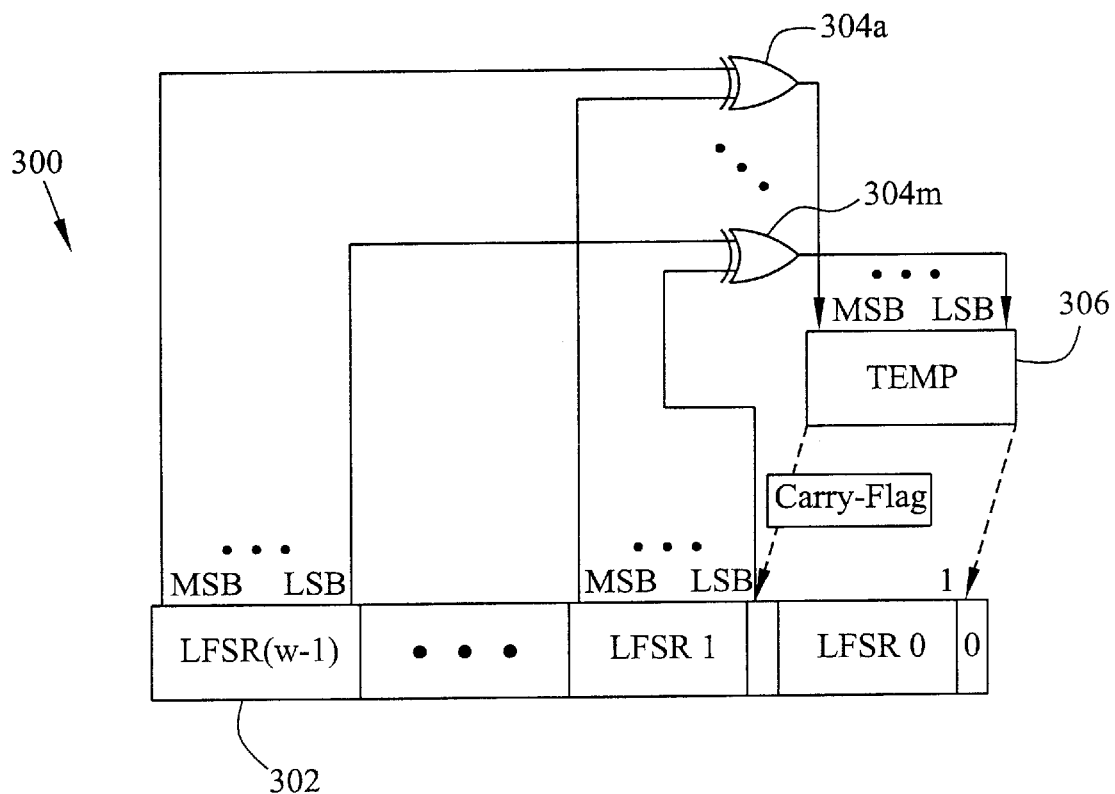
FIG. 4 is-a block diagram of a linear feedback shift register according to the present invention.

A word-by-word left shifting LFSR according to the present invention is illustrated generally at 300 in FIG. 4. Although the following description describes word-by-word left shifting LFSR 300, the present invention equally applies to a word-by-word right shifting LFSR. Word shifting LFSR 300 includes N storage elements 302 which are divided into w words of word length M represented as LFSR 0, LFSR 1, . . . , LFSR(w−1). In the embodiment of LFSR 300 illustrated in FIG. 4, a linear feedback function is performed by XOR logic functions 304a–304m corresponding to the number of bits M in a word of word length M. An alternative embodiment of a LFSR according to the present invention includes a linear feedback function performed by exclusive-nor logic functions. XOR logic functions 304a–304m perform XOR logical operations on corresponding bits of LFSR(w−1) and LFSR 1 to provide a temporary value or storage word 306. For example, the MSB of LFSR(w−1) and the MSB of LFSR 1 are XORed by XOR logic function 304a to provide the MSB of temporary storage word 306. Similarly, the LSB of LFSR(w−1) is XORed with the LSB of LFSR 1 by XOR logic function 304m to provide the LSB of temporary storage word 306. All intervening bits are similarly XORed. The MSB of the temporary storage word 306 has exactly the same value that would be used to advance an equivalent bit-by-bit implementation by one bit, The next most significant bit of the temporary storage word 306 has exactly the same value that would be used to advance an equivalent bit-by-bit implementation by a second bit. And so on, with the LSB of the temporary storage word 306 having exactly the same value as the Mth bit produced by an equivalent bit-by-bit implementation. Again, LFSR 0 includes a zero bit in its LSB location because the feedback polynomial f(x) of LFSR 300 must be primitive to provide good statistics (i.e., to make LFSR 300 a maximal-length LFSR). Accordingly, the N number of storage elements 302 must not be a multiple of 8.

In one embodiment, the state of word-by-word LFSR 300 is advanced as follows. The contents of LFSR 2 are placed into to LFSR3. The contents of LFSR 1 are placed into to LFSR 2. Temporary storage word 306 is left shifted by one-bit location to shift a zero into the LSB of temporary storage word 306. In one embodiment, the MSB is left shifted out of temporary storage word 306 into a carry-flag. The contents of LFSR 0 are placed into the m−1 MSBs of LFSR 1 and the carry-flag is placed into the LSB of LFSR 1. The contents of temporary storage word 306 are then placed into LFSR 0 to complete the word advancement of LFSR 300.

Thus, the state of word-by-word left shifting LFSR 300 advances a full word at a time. The LFSR feedback through XOR functions 304a–304m is selected from T tap sources from storage elements 302, each tap source being multiples of the computer system's word size M. On computer systems which can access and manipulate words of different sizes M, such as the Intel Pentium Processor, which can access 8, 16, 32, or 64 bit words, any of the available word sizes M are usable. The larger word sizes produce more bits per each advancement of the LFSR 300.

The preferred length N of LFSR 300 is selected to be one less than the exact multiple of the word size M. It would be desirable to have the number N of LFSR storage elements 302 be an exact multiple of the word size M; but as stated above, there are no maximal-length LFSRs with a size N which is a multiple of 8.

An adjustment is needed to place the full word stored in temporary storage word 306 into a register (i.e., LFSR 0) which uses one less bit than a word size (i.e., LFSR 0 has a stage length of M−1). It is for this reason, that the temporary word resulting from the XOR linear feedback function 304 is first stored in temporary storage word 306 and then temporary storage word 306 is left shifted one bit to shift in a zero bit and to shift out the MSB into the carry-flag. The carry flag is then put in the LSB of LFSR 1 to replace the bit in that word that had been zeroed by the left shift in the previous iteration.

The following pseudo-C code II implements a 127-bit two-tap (i.e., T=2) word-by-word left shifting LFSR 300 according to the present invention,on a 32-bit word computer system and produces exactly the same output sequence as Pseudo-C code I previously described.

Pseudo-C code II

```
temp=(LFSR[3]^LFSR[1])<<1; /* lost bit put into carry-
    flag*/
LFSR[3]=LFSR[2];
LFSR[2]=LFSR[1];
LFSR[1]=LFSR[0]+carry; /* use ADD WITH CARRY
    instruction*/
LFSR[0]=temp;
```

As can be seen by the above pseudo-C code 11 implementation of 127-bit word-by-word left shifting LFSR 300 on a 32-bit word computer system, there are only about eight instructions required to obtain a whole new 32-bit word left shifted into the word-by-word LFSR 300 according to the present invention. This compares to the more than 544 instructions represented by the above pseudo-C code I required to obtain a whole new 32-bit word left shifted into the 127-bit conventional bit-by-bit LFSR 200. As noted in the above pseudo-C code 11 for implementing the 127-bit word-by-word left shifting LFSR 300, the lost bit from left shifting "temp" is stored in the carry-flag. Thus, when the contents of LFSR[1] are replaced with the contents of LFSR[0], the carry-flag is added into LFSR[1] along with LFSR[0] with an ADD WITH CARRY instruction, which exists on almost all modern computers.

If the above pseudo-C code II for implementing the word-by-word LFSR 300 is performed in a software loop, the software loop can be unrolled to shift the four LFSR words each iteration. In one embodiment, register or location renaming, such as arithmetic logic unit (ALU) register renaming, is used instead of movement of words for each of the "LFSR[ ]=" operations. In this embodiment, only three instructions are required to obtain a whole new 32-bit (or any other word size) word left shifted into word-by-word LFSR 300 implemented as a 127-bit LFSR. Comparing these three instruction versus the more than 544 instructions required to produce the same sequence using the conventional art, one can appreciate that the word-by-word LFSR of the present invention is over 180 times faster than the conventional art bit-by-bit LFSR for this particular 127-bit LFSR implementation. Using 64-bit words, three instructions can produce 64 new bits of the exact same LFSR sequence, which is another two times faster.

Although the word-by-word LFSR 300 according to the present invention can be implemented in hardware or software, the word-by-word LFSR 300 is particularly useful for replacing other types of conventional software implemented LFSRs.

The conventional matrix multiply speed-up technique where a matrix multiply operation (implemented as a table look-up) is employed to advance an LFSR by multiple bits would require a 16-gigabyte table for 32-bit word advancements. This table would not fit into the first or second level caches of any known processors and the accesses would be essentially random, causing a double cache miss for almost all table fetches. In addition, it would take a long time to initialize the 16-gigabyte table. Thus, the 32×32 matrix multiply would require a very large amount of memory and would be much slower than the above word-by-word LFSR 300 according to the present invention.

The conventional technique to run parallel LFSRs would be much slower to initialize than the word-by-word LFSR 300 according to the present invention, because an array of words would be initialized. The number of words in the array has to be the same as the number of stages; e.g. a 127 stage LFSR needs 127 words of storage. Moreover, the parallel LFSRs would be slower than the word-by-word LFSR 300 in creating each new word of output because either all 127 words have to be shifted, or modular arithmetic (mod 127) has to be performed on the addresses for the 127 words to calculate the address of where the taps are and where the newly produced word is to be stored.

For the above reasons, the software implemented word-by-word LFSR 300 according to the present invention is significantly faster than any of the known conventional LFSR software implementations. Thus, word-by-word LFSR 300 according to the present invention can be employed in a real-time cryptosystem, which needs to produce bits at a very high frequency. For example, when implementing the above pseudo-C code II unrolled on a 500 MHz Pentium Intel Processor, the LFSR can be advanced at a rate greater than 10 Gigabits per second (Gbps).

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A pseudo-random number generator comprising:
a linear feedback shift register (LFSR) having a state and including:
N storage elements together storing N bits of binary data which are separated into w words having word length M and including T tap sources, each tap source providing binary data from the storage elements and having a number of bits which is a multiple of M;
a linear feedback function coupled to the T tap sources and providing a temporary value, having a number of bits which is a multiple of M, which is a linear function of the binary data provided from the T tap sources; and
wherein the LFSR state is advanced by shifting the binary data in the storage elements by a multiple of M bits using register or location renaming and providing the temporary value to fill in storage elements that would otherwise be empty from the shifting.

2. The pseudo-random number generator of claim 1 wherein the LFSR is implemented in software.

3. The pseudo-random number generator of claim 2 wherein the LFSR is implemented in computer system which accesses more than one computer word size, wherein each computer word size includes M bits.

4. The pseudo-random number generator of claim 1 wherein N is one less than a multiple of the M.

5. The pseudo-random number generator of claim 4 wherein the LFSR state is advanced by left shifting and the least significant bit of the least significant LFSR word is a zero.

6. The pseudo-random number generator of claim 5 wherein the temporary value is left shifted by one bit with a zero shifted into the 'least significant bit and then, stored in the least significant LFSR word(s).

7. The pseudo-random number generator of claim 6 wherein the lost bit resulting from the temporary value being left shifted by one bit is stored in a carry-flag.

8. The pseudo-random number generator of claim 7 wherein the carry-flag replaces the least significant bit that had been zeroed by the left shift of the temporary value in the previous iteration.

9. The pseudo-random number generator of claim 8 wherein the carry-flag replacement is performed with an ADD WITH CARRY instruction prior to left shifting that word to the second least significant LFSR word position.

10. The pseudo-random number generator of claim 4 wherein the LFSR state is advanced by right shifting.

11. The pseudo-random number generator of claim 1 wherein the LFSR is implemented hardware.

12. The pseudo-random number generator of claim 1 wherein the linear feedback function is a bit-wise exclusive-or function.

13. The pseudo-random number generator of claim 1 wherein the linear feedback function is a bit-wise exclusive-nor function.

14. The psuedo-random number generator of claim 1 wherein each tap source has a number of bits which is a multiple of M and taken from contiguous storage elements beginning or ending on a storage element that is a multiple of M.

15. A stream cipher cryptosystem comprising:
psuedo-random bit generator receiving a key and providing a keystream, the pseudorandom bit generator including:
a linear feedback shift register (LFSR) having a state and including:

N storage elements together storing N bits of binary data which are separated into w words having word length M and including T tap sources, each tap source providing binary data having a number of bits which is a multiple of M;

a linear feedback function coupled to the T tap sources and providing a temporary storage word which is a linear function of the binary data provided from the T tap sources; and wherein the LFSR state is advanced by shifting the binary data in the storage elements by a multiple of M bits using register or location renaming and providing the temporary storage word to fill in storage elements that would otherwise be empty from the shifting; and a cryptographic combiner for combining a first binary data sequence and the keystream to provide a second binary data sequence.

16. The stream cipher cryptosystem of claim 15 wherein the cryptographic combiner is an encryption combiner and the first binary data sequence is a plaintext binary data sequence and the second binary data sequence is a ciphertext binary data sequence.

17. The pseudo-random number generator of claim 16 wherein the cryptographic combiner is a decryption combiner and the first binary data sequence is a ciphertext binary data sequence and the second binary data sequence is a plaintext binary data sequence.

18. A method of generating a pseudo-random number, the method comprising the steps of:

storing N bits of binary data in storage locations in a linear feedback shift register (LFSR), wherein the N bits of binary data are separated into w words having word length M;

providing T tap sources of binary data from the N bits of binary data, each tap source providing binary data having a number of bits which is a multiple of M;

providing a temporary value, having a number of bits which is a multiple of M, which is a linear function of the binary data provided from the T tap sources;

shifting the stored binary data by a multiple of M bits using register or location renaming; and providing the temporary value to fill in storage locations that would otherwise be empty from the shifting step.

19. The method of claim 18 wherein the method is implemented in a computer system which accesses more than one computer word size, wherein each computer word size includes M bits.

20. The method of claim 18 wherein N is one less than a multiple of the M.

21. The method of claim 18 wherein the shifting step includes left shifting the LFSR.

22. The method of claim 21 wherein the least significant bit of the least significant LFSR word is a zero.

23. The method of claim 22 further comprising the steps of:

left shifting the temporary value by one bit with a zero shifted into the least significant bit; and storing the left shifted temporary value into the least significant LFSR word.

24. The method of claim 23 further comprising the step of:

storing the lost bit resulting from the temporary value being left shifted by one bit into a carry-flag.

25. The method of claim 24 further comprising the step of:

replacing the least significant bit that had been zeroed by the left shift of the temporary value in the previous iteration.

26. The method of claim 25 wherein the replacing step is performed with an ADD WITH CARRY instruction prior to left shifting the LFSR.

27. The method of claim 18 wherein the shifting step includes right shifting the LFSR.

28. The method of claim 18 wherein the shifting step is performed by register or location renaming instead of movement of words.

29. The method of claim 18 wherein the linear feedback function is a bit-wise exclusive-or function.

30. The method of claim 18 wherein the linear feedback function is a bit-wise exclusive-nor function.

31. The method of claim 18 wherein each tap source has a number of bits which is a multiple of M and taken from contiguous storage elements beginning or ending on a storage element that is a multiple of M.

* * * * *